US011979760B2

(12) United States Patent
Yang et al.

(10) Patent No.: US 11,979,760 B2
(45) Date of Patent: May 7, 2024

(54) PHYSICAL DOWNLINK CONTROL CHANNEL MONITORING SCALING

(71) Applicant: Apple Inc., Cupertino, CA (US)

(72) Inventors: Weidong Yang, San Diego, CA (US); Amir Farajidana, Sunnyvale, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Keith W. Saints, San Diego, CA (US); Linbo Li, San Diego, CA (US); Oghenekome Oteri, San Diego, CA (US); Sigen Ye, Whitehouse Station, NJ (US); Wei Zeng, Saratoga, CA (US); Wei Zhang, Santa Clara, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 17/593,419

(22) PCT Filed: Aug. 4, 2020

(86) PCT No.: PCT/CN2020/106912
§ 371 (c)(1),
(2) Date: Sep. 17, 2021

(87) PCT Pub. No.: WO2022/027255
PCT Pub. Date: Feb. 10, 2022

(65) Prior Publication Data
US 2022/0303799 A1    Sep. 22, 2022

(51) Int. Cl.
*H04W 24/08*    (2009.01)
*H04L 1/00*    (2006.01)
(Continued)

(52) U.S. Cl.
CPC .......... *H04W 24/08* (2013.01); *H04L 1/0038* (2013.01); *H04W 72/0446* (2013.01); *H04W 72/23* (2023.01)

(58) Field of Classification Search
CPC .......................... H04W 24/08; H04W 72/042
See application file for complete search history.

(56) References Cited

U.S. PATENT DOCUMENTS

| 10,470,230 B2 | 11/2019 | Rahman et al. |
| 2014/0293888 A1 | 10/2014 | Oh et al. |

(Continued)

FOREIGN PATENT DOCUMENTS

| CN | 110786067 | 2/2020 |
| CN | 110999494 | 4/2020 |
| JP | 2019-118036 | 7/2019 |

OTHER PUBLICATIONS

Nokia et al., "Summary of AI 6.1.2.3.7 QCL"; 3GPP TSG RAN WG1 #90; R1-1715074; Aug. 26, 2017; 13 sheets.

(Continued)

*Primary Examiner* — Zhiren Qin
(74) *Attorney, Agent, or Firm* — Fay Kaplun & Marcin, LLP

(57) ABSTRACT

A user equipment (UE) monitors a Physical Downlink Control Channel (PDCCH) in multiple component carriers (CC). The UE determines if the UE is operating in carrier aggregation (CA) mode having a first CC in a first frequency band and a second CC in a second frequency band. When the UE is operating in CA with a first CC in the first frequency band and the second CC in the second frequency band, the UE determines a span pattern for PDCCH symbols being received on the first and second CC and selects a PDCCH monitoring type based on, at least, the span pattern. A UE also determines if a first CC and a second CC of a CA combination are collocated and selects a PDCCH monitor- (Continued)

ing type based on, at least, the determination of whether the first and second CC are collocated.

20 Claims, 10 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2015/0131527 A1 | 5/2015 | Kenney et al. | |
| 2016/0100447 A1 | 4/2016 | Chen et al. | |
| 2017/0289829 A1 | 10/2017 | Alvarino et al. | |
| 2018/0278368 A1 | 9/2018 | Kim et al. | |
| 2018/0288755 A1 | 10/2018 | Liu et al. | |
| 2020/0329389 A1* | 10/2020 | Hosseini | H04W 72/23 |
| 2021/0168774 A1* | 6/2021 | Li | H04L 5/0053 |
| 2021/0328642 A1 | 10/2021 | Dalsgaard et al. | |
| 2021/0360593 A1* | 11/2021 | Hosseini | H04L 5/0053 |
| 2022/0329399 A1* | 10/2022 | Kittichokechai | H04L 5/0053 |
| 2023/0049505 A1* | 2/2023 | Takahashi | H04W 72/23 |
| 2023/0051329 A1 | 2/2023 | Flordelis et al. | |

OTHER PUBLICATIONS

Apple Inc., "Discussion on PDCCH enhancements for eURLLC", 3GPP TSG RAN WG1 Meeting #101-e, R1-2004874, Jun. 15, 2020, 8 sheets.

MediaTek Inc., "Views on Rel-16 UE features for NR URLLC/IIoT"; 3GPP TSG RAN WG1 Meeting #100bis-e; R1-2001828; Apr. 30, 2020; 4 sheets.

Ericsson, "Remaining Issue of PDCCH Enhancements for NR URLLC"; 3GPP TSG-RAN WG1 Meeting #100bis; R1-2001784; Apr. 30, 2020; 21 sheets.

Moderator (Huawei), "Summary of email discussion [100e-NR-L1enh_URLLC_PDCCH-02] on remaining issue on scaling PDCCH monitoring capability"; 3GPP TSG-RAN WG1 Meeting #100bis-e, May 2, 2020, R1-2001784, 60 sheets.

\* cited by examiner

PHYSICAL DOWNLINK CONTROL CHANNEL MONITORING SCALING

BACKGROUND

A user equipment (UE) may establish a connection to at least one of a multiple different networks or types of networks. To establish and/or maintain the network connection, the UE may monitor a physical downlink control channel (PDCCH) to receive downlink control information from the network. In some instances, the UE may be operating in a carrier aggregation (CA) configuration with the network. In CA, the UE may exchange information with the network using multiple component carriers (CC). During CA operation, the UE may monitor the PDCCH on the multiple CCs.

SUMMARY

Some exemplary embodiments are related to a method performed by a user equipment (UE). The method includes determining the UE is operating in carrier aggregation (CA) mode having a first component carrier (CC) in a first frequency band and a second CC in a second frequency band, when the UE is operating in CA with a first CC in the first frequency band and the second CC in the second frequency band, determining a span pattern for Physical Downlink Control Channel (PDCCH) symbols being received on the first and second CC and selecting a PDCCH monitoring type based on, at least, the span pattern.

Other exemplary embodiments are related to a user equipment (UE) having one or more processors and a transceiver communicatively connected to the one or more processors. The processors are configured to determine if the UE is operating in carrier aggregation (CA) mode having a first component carrier (CC) in a first frequency band and a second CC in a second frequency band, when the UE is operating in CA with a first CC in the first frequency band and the second CC in the second frequency band, determine a span pattern for Physical Downlink Control Channel (PDCCH) symbols being received on the first and second CC and select a PDCCH monitoring type based on, at least, the span pattern.

Still further exemplary embodiments are related to a method performed by a user equipment (UE). The method includes determining if a first component carrier (CC) and a second CC of a carrier aggregation (CA) combination are collocated and selecting a PDCCH monitoring type based on, at least, the determination of whether the first and second CC are collocated.

Additional exemplary embodiments are related to a user equipment (UE) having one or more processors and a transceiver communicatively connected to the one or more processors. The processors are configured to determine if a first component carrier (CC) and a second CC of a carrier aggregation (CA) combination are collocated and select a PDCCH monitoring type based on, at least, the determination of whether the first and second CC are collocated.

DETAILED DESCRIPTION

Figure 1:
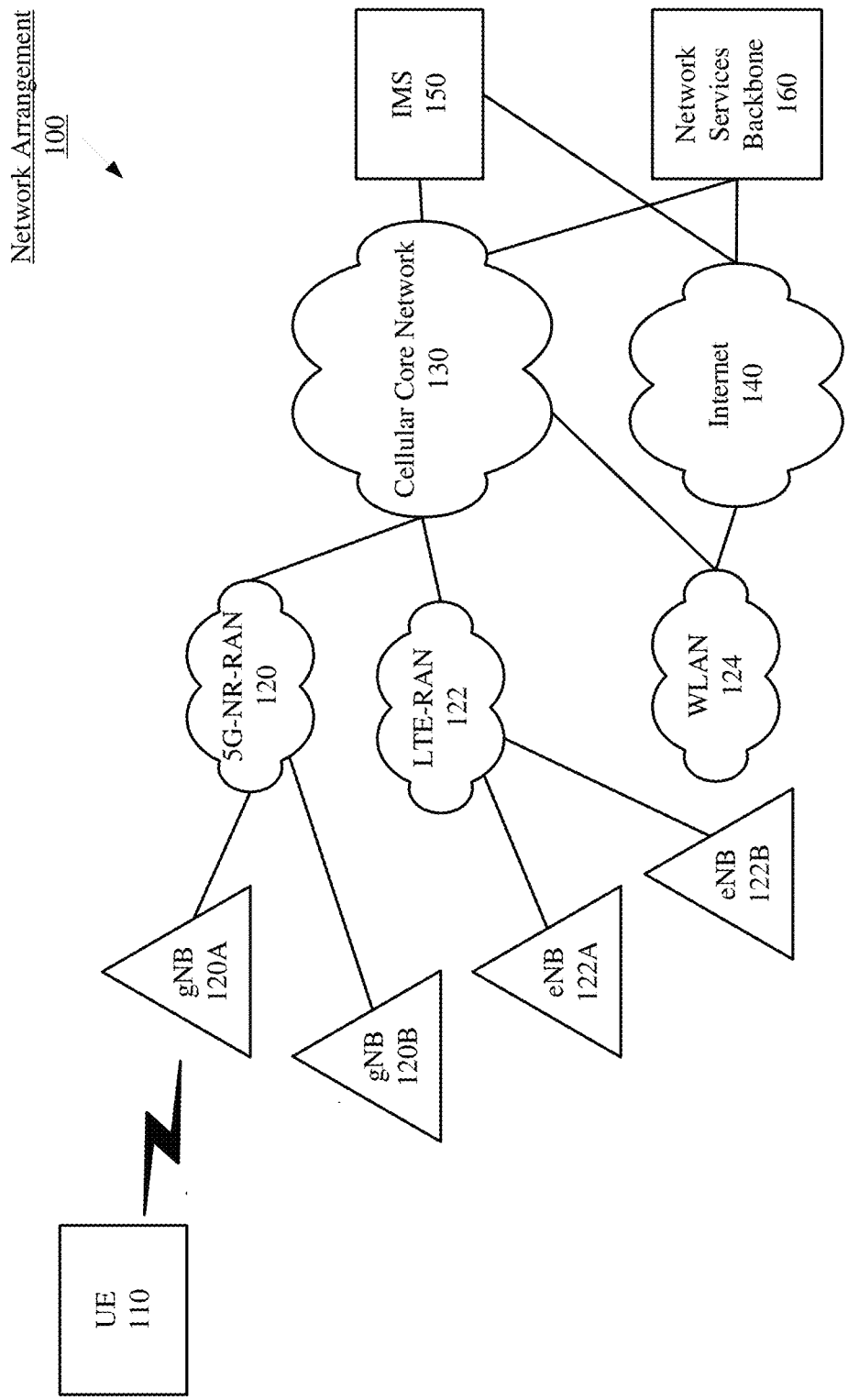
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) monitoring PDCCH symbols in a carrier aggregation (CA) scenario.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In addition, the exemplary embodiments are described with regard to a 5G New Radio (NR) cellular network. However, reference to a 5G NR network is merely provided for illustrative purposes. The exemplary embodiments may be utilized with any network that implements the functionalities described herein for UE capability reporting. Therefore, the 5G NR network as described herein may represent any network that includes the functionalities described herein for the 5G NR network.

The exemplary embodiments are also described with reference to an ultra-reliable low-latency communication (URLLC). It is envisioned that. URLLC will support delay sensitive use cases such as autonomous driving, robotic surgery, factory automation, etc. However, while the exemplary embodiments are described with reference to URLLC, it should be understood that the principles described herein for monitoring the PDCCH may be applied to any type of communications.

The exemplary embodiments are also described with reference to PDCCH monitoring in carrier aggregation (CA) scenario. Those skilled in the art will understand that CA relates to a UE being configured with a plurality of component carriers (CCs). Each CC may represent a channel that facilitates communication between the UE and the network over a particular frequency band. A plurality of CCs may correspond to the same frequency band, each CC may correspond to a different band or a combination thereof. Further, each CC has a particular bandwidth, the more CCs the UE is configured with the more bandwidth that is available for communications with the network. Example CA scenarios such as intra-band contiguous CA, intra-band non-contiguous and inter-band CA are described in further detail below. However, it should be understood that CA is only one example of a UE receiving information on multiple frequency bands. The exemplary embodiments may also apply to other scenarios where the UE receives information on multiple frequency bands, such as, NR dual connectivity (DC).

In addition, the exemplary embodiments are described with reference to two CCs. It should be understood that CA may include more thane two CCs. Those skilled in the art will understand how the principles described herein for two CCs may be extended to handle monitoring PDCCH symbols in more than two CCs.

The exemplary embodiments relate to a UE selecting a type of PDCCH monitoring. In a first aspect, the exemplary embodiments include the UE selecting the type of PDCCH monitoring based on a span pattern of the PDCCH. In a second aspect, the exemplary embodiments include the UE selecting the type of PDCCH monitoring based on collocation information for component carriers (CCs) of a CA combination.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.). Further details of the 5G NR-RAN 120 will be provided below.

The base stations (e.g., the gNE 120A, the gNB 120E, the eNB 122A) may include one or more communication interfaces to exchange data and/or information with camped UEs, the corresponding RAN, the cellular core network 130, the internet 140, etc. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNE 120A of the 5G NR-RAN 120). As mentioned above, the use of the 5G NR-RAN 120 is for illustrative purposes and any type of network may be used.

The use of a separate 5G NR-RAN 120 and LTE-RAN 122 is merely provided for illustrative purposes. An actual network arrangement may include a RAN that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (FPS) or the 5G core (5GC).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
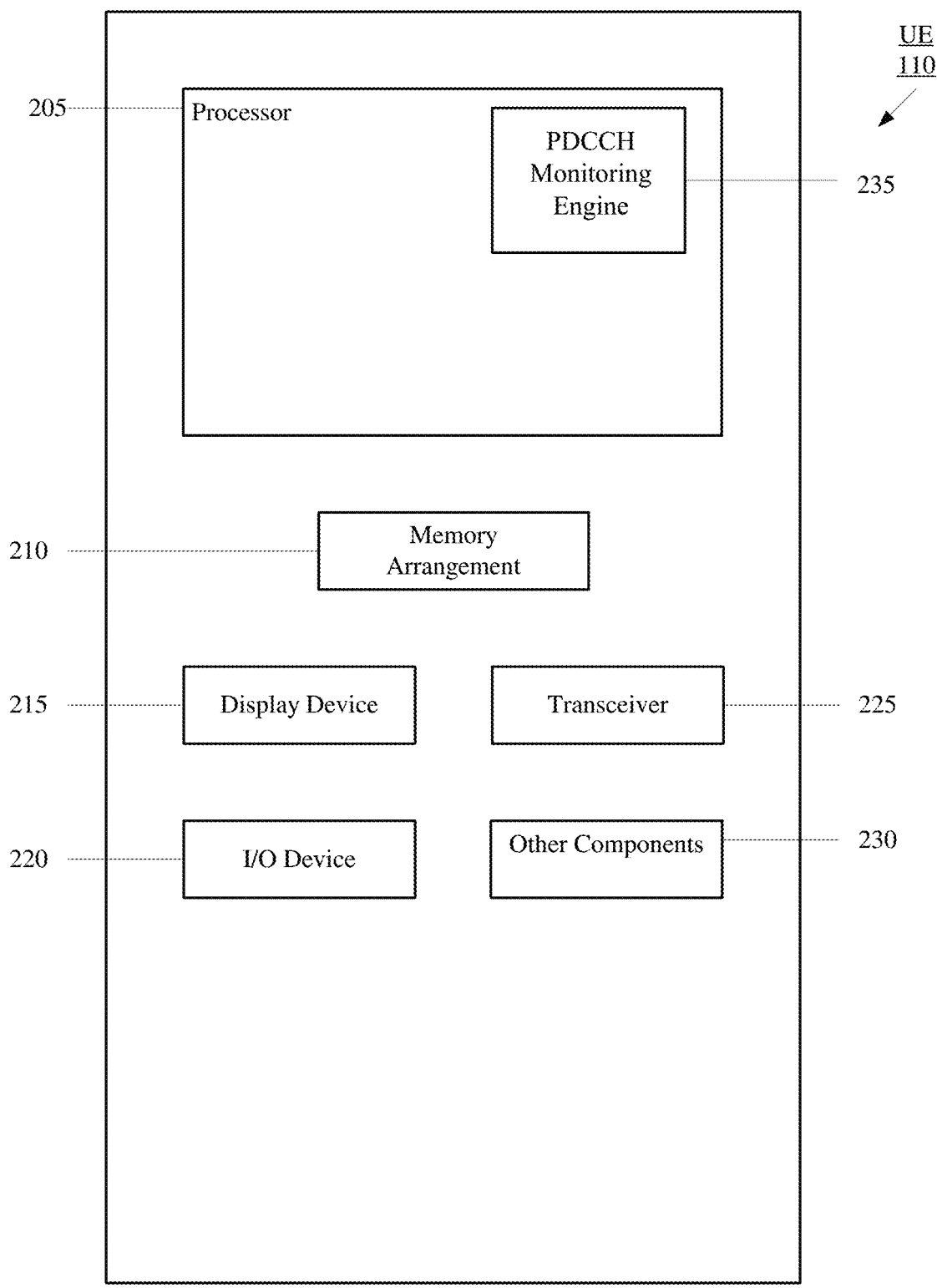
FIG. 2 shows an exemplary user equipment (UE) according to various exemplary embodiments.

FIG. 2 shows an exemplary user equipment (UE) 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a SIM card, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a PDCCH monitoring engine 235. The PDCCH monitoring engine 235 may perform various operations related to monitoring the PDCCH including the selecting of the type of PDCCH monitoring to be performed by the UE 110. As will be described in greater detail below, the UE 110 may select the type of PDCCH monitoring based on one or more different types of information including a span pattern of the received PDCCH and collocation information for CCs.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 1120 may be separate components or integrated together such as a touchscreen. The transceiver 225 may be a hardware component configured to establish a connection with the 5G NR-RAN 120, the LTE-RAN 122, the LAN 124, etc. Accordingly, the transceiver 225 may operate on a variety of different frequencies or channels (e.g., set of consecutive frequencies).

Figure 3:
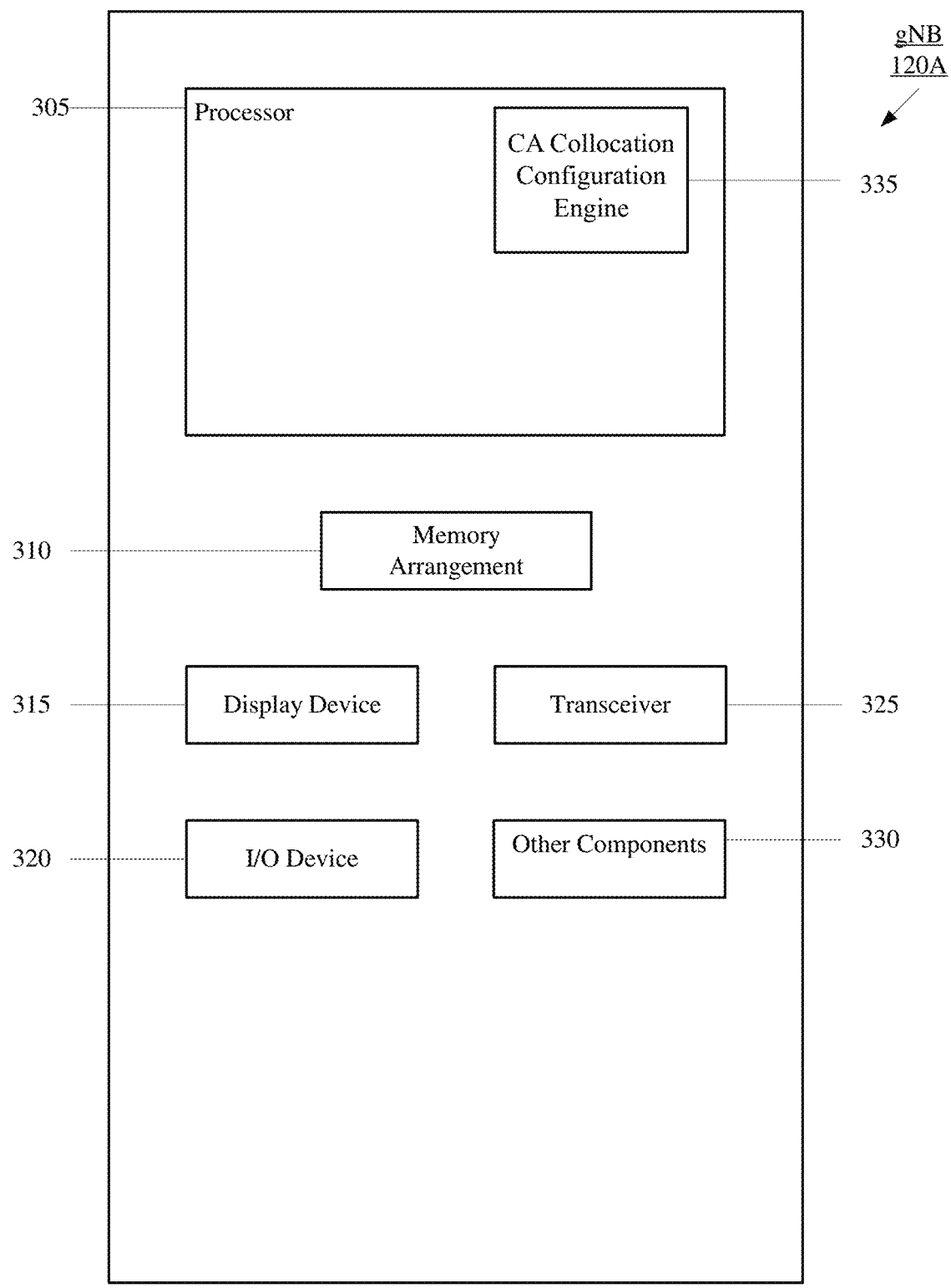
FIG. 3 shows an exemplary network cell according to various exemplary embodiments.

FIG. 3 shows an exemplary network cell according to various exemplary embodiments. In this example, it may be considered that the network cell is the gNB 120A of FIG. 1. The network cell illustrated in FIG. 3 may also represent the gNB 120B or any other gNB of the 5G NR-RAN 120. The gNB 120A may represent any access node of the 5G NR network through which the UE 110 may establish a connection and manage network operations.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a CA collocation configuration engine 335 for providing the UE 110 with configuration information for monitoring the PDCCH in CA scenarios.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The 110 device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies).

Therefore, the transceiver 325 may include one or more components (e.g., radios) to enable the data exchange with the various networks and UEs.

Figure 4A:
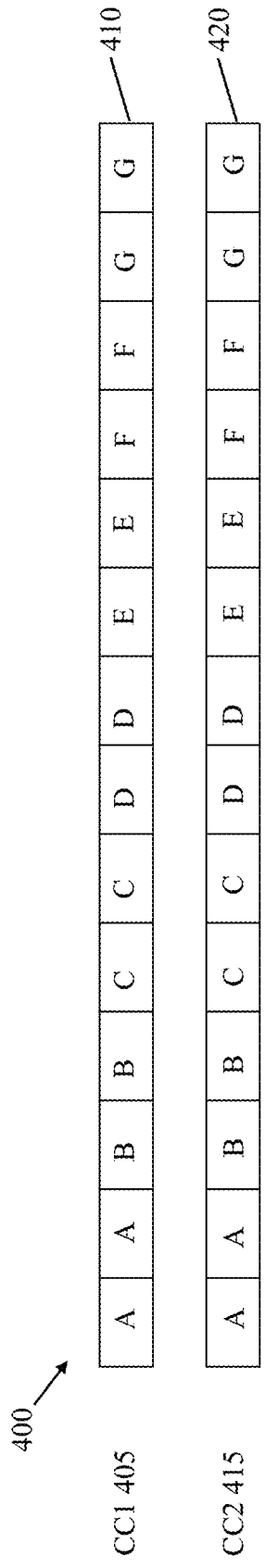
FIGS. 4A and 4B show exemplary timing diagrams for two component carriers (CCs) carrying physical downlink control channel (PDCCH) symbols.
Figure 4B:
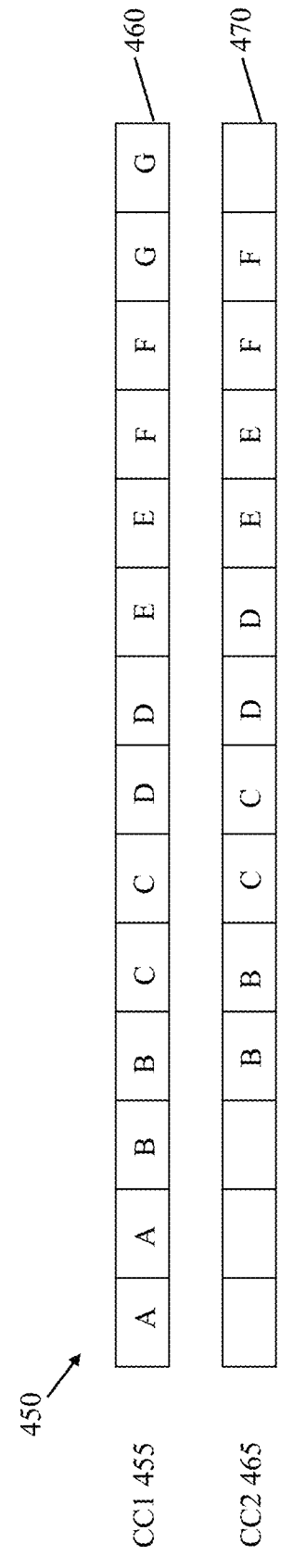

FIGS. 4A and 4B show exemplary timing diagrams 400 and 450 for two component carriers (CCs) carrying PDCCH symbols. FIG. 4A shows example slots 410 and 420 for URLLC corresponding to two CCs 405 and 415 where the corresponding PDCCH symbols are aligned. The slots 410 and 420 are shown as having 7 pairs of symbols labelled A-G resulting in 14 total symbols in each of the slots 410 and 420. In this example, the slots 410 and 420 have a span pattern of $\{2, 2\}$. The span pattern will be described in greater detail below. This is considered an aligned case because the corresponding PDCCH symbols for each CC 405 and 410 (e.g., symbols A of CC1 405 and symbols A of CC2 415) arrive at the UE 110 at the same time.

FIG. 4B shows example slots 460 and 470 for URLLC corresponding to two CCs 455 and 465 where the PDCCHs are unaligned. In this example, the slots 460 and 470 also have a span pattern of $\{2, 2\}$. This is considered an unaligned case because the corresponding PDCCH symbols for each CC 455 and 465 (e.g., symbols B of CC1 455 and symbols B of CC2 465) do not arrive at the UE 110 at the same time. As will be described in greater detail below, the type of PDCCH monitoring may be selected based on, at least, whether the PDCCH is aligned or unaligned.

Figure 5:
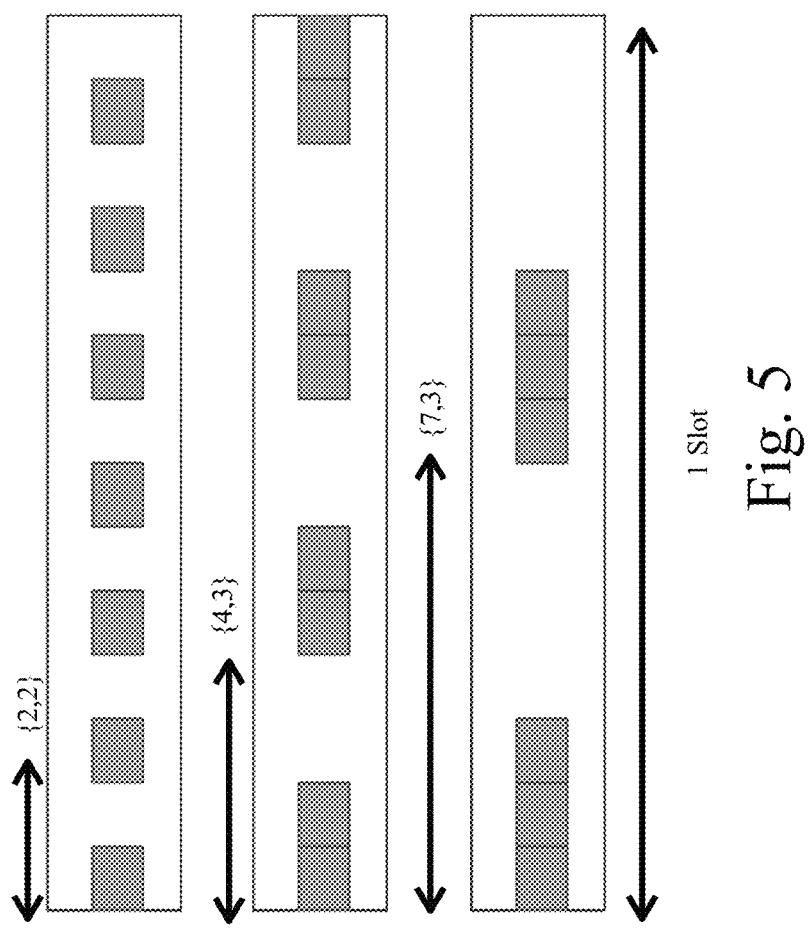
FIG. 5 illustrates three exemplary span patterns relative to one slot.

A span pattern may be defined by a pair of a number of symbols $\{X, Y\}$. X may represent a minimum number of consecutive symbols between first symbols of two PDCCH monitoring occasions in two respective consecutive span patterns. Y may represent the number of consecutive symbols for PDCCH monitoring occasions within X symbols, starting from the first symbol of X symbols. FIG. 5 illustrates three different span patterns relative to one slot. The three span patterns, $\{2, 2\}$, $\{4, 3\}$, $\{7, 3\}$, may be defined in the specifications for the various networks (e.g., 3GPP standards).

The UE 110 may be configured to the find downlink control information relevant to the UE 110 within a subframe by monitoring and blindly decoding a particular set of control channel elements (CCEs) that include PDCCH candidates (e.g., CCEs onto which PNCCHs are mapped). For example, for the aligned case, the UE 110 processing resource/power, including the number of blind decodes and channel estimation (non-overlapping CCEs) can be shared among different CCs. For the unaligned case, the worst span in each CC is used in counting the number of blind decodes and the number of non-overlapping CCEs. Examples of the number of blind decodes for the aligned case and the unaligned case will be provided below. Throughout this description, the term PDCCH monitoring should be considered to include all the associated operations of receiving, blindly decoding and channel estimation for the PDCCH candidates.

Figure 6:
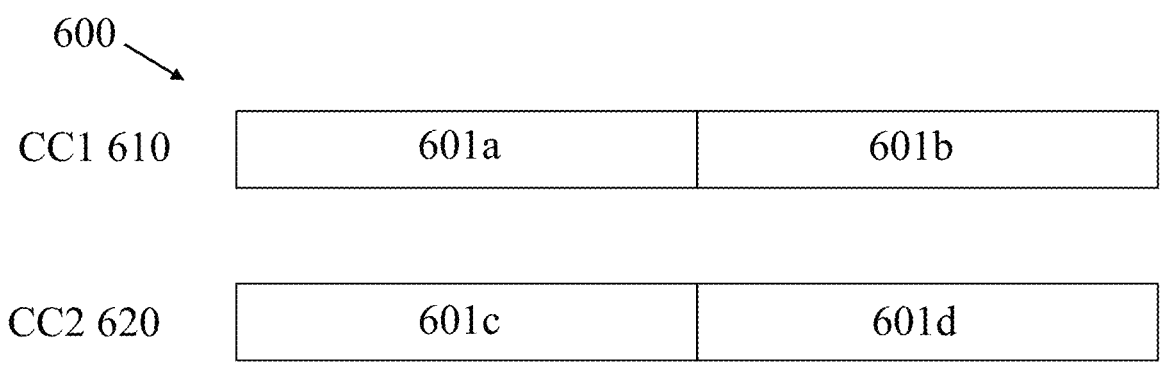
FIG. 6 shows a timing diagram including two corresponding PDCCH symbol pairs on each of two CCs.

FIG. 6 shows a timing diagram 600 including two corresponding PDCCH symbol pairs 601a-d on each of two CCs 610 and 620. The symbols 601a-d may represent one of the symbol pairs as shown in FIGS. 3A-B (e.g., symbols pairs B in FIGS. 3A-B). As will be described in greater detail below, the symbols 601a-d may be considered as aligned or unaligned. In FIG. 6, the symbols are shown as being aligned but this is only for illustrative purposes.

The following will describe various types of PDCCH monitoring with reference to FIG. 6. Thus, throughout this description, when it is described that the UE 110 selects a type of PDCCH monitoring, the following provides examples of the types of PDCCH monitoring available to the UE 110. The exemplary types of PDCCH monitoring are described with reference to UE processing resource/power limits. The limits may be, for example, the number of blind decodes that are performed per PDCCH symbol pair, a number of channel estimations for non-overlapping CCEs, etc.

In a first example, it may be considered that the symbols 601*a-d* are aligned (e.g., symbols 601*a* and 601*c* are aligned in time and symbols 601*b* and 601*d* are aligned in time.). In the first example, the PDCCH monitoring limit (e.g., the number of blind decodes per symbol pair, the number of channel estimations for non-overlapping CCEs, etc.) may be determined as follows:

$$601a+601b+601c+601d <= \text{Threshold\_1}$$

Thus, in this example, the maximum number of blind decodes may be shared over all the symbols 601*a-d* of the symbol pair. This PDCCH monitoring type may be referred to as a Rel. 15 aligned monitoring type. Rel. 15 refers to Release 15 of the 3GPP standards.

In a second example, it may be considered that the symbols 601*a-d* are aligned as in the first example. However, in the second example, the PDCCH monitoring limit may be determined as follows:

$$601a+601c <= \text{Threshold\_2}$$

$$601b+601d <= \text{Threshold\_2}$$

Thus, in this example, the maximum number of blind decodes may be shared for corresponding symbols of the symbol pair. This PDCCH monitoring type may be referred to as a Rel. 16 aligned monitoring type.

In a third example, it may be considered that the symbols 601*a-d* are unaligned. In the third example, the PDCCH monitoring limit may be determined as follows:

$$\max(601a, 601b) + \max(601c, 601d) <= \text{Threshold\_3}$$

Thus, in this example, the maximum number of blind decodes may be based on the maximum number of blind decodes for the PDCCH symbols per CC. This PDCCH monitoring type may be referred to as a Rel. 16 unaligned monitoring type.

It is noted that in the above examples, the value of the thresholds (e.g., Threshold_1, Threshold_2, Threshold_3) may be the same or may be different. In addition, the value of the thresholds may change depending on any number of factors including the capability of the individual UE, the span pattern configuration of the PDCCH, etc.

Figure 7:
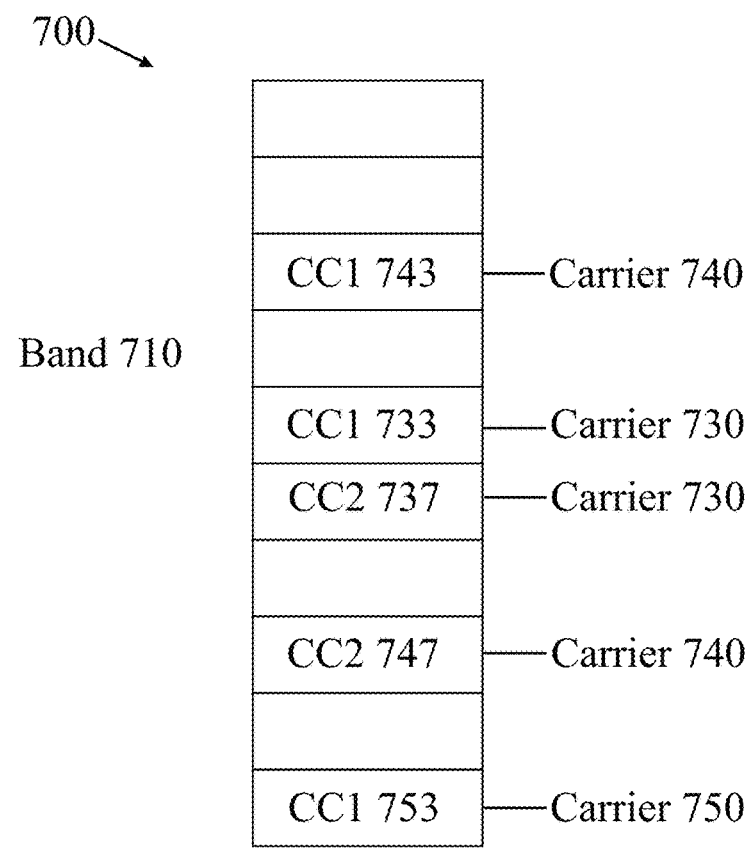
FIG. 7 shows a frequency band diagram including two exemplary frequency bands.
Figure 7:
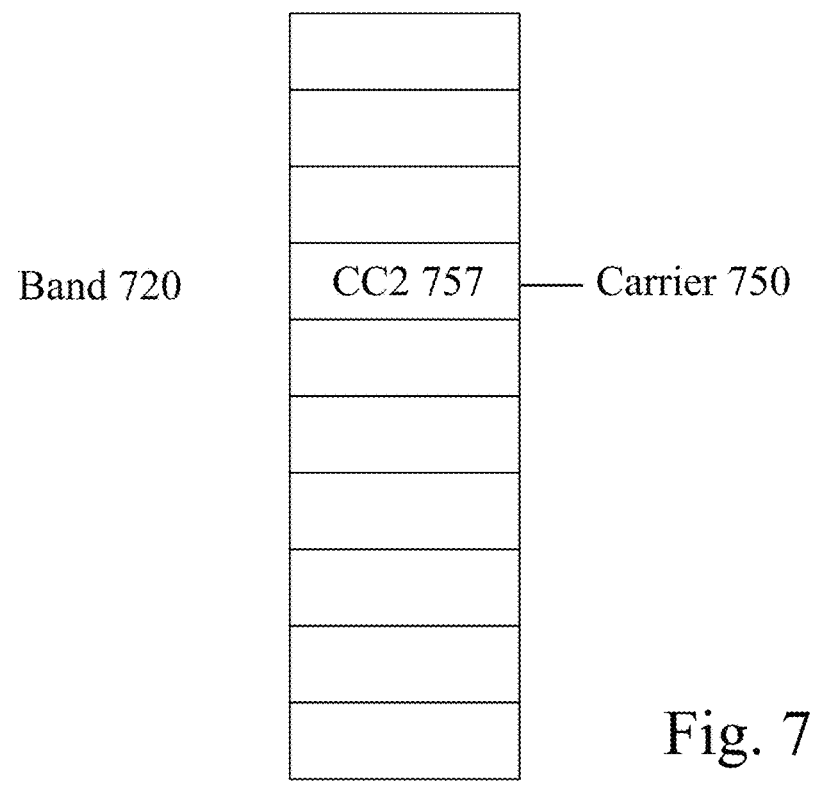

FIG. 7 shows a frequency band diagram 700 including two exemplary frequency bands 710 and 720. In the frequency band diagram 700, it may be considered that frequency band 710 corresponds to Frequency Range 1 (FR1) and frequency band 720 corresponds to FR2 of the 5G NR-RAN 120. However, this is only exemplary and the frequency bands 710 and 720 may correspond to any frequency bands. In the frequency band diagram 700, each frequency band includes ten (10) sub-bands. Again, this is only exemplary as those skilled in the art will understand that FR1 and FR2 include many more than 10 sub-bands.

The purpose of frequency band diagram 700 is to describe various CA scenarios in which the UE 110 may be operating. For the purposes of this description, it may be considered that there are three carriers 730-750 that are operating within the frequency bands 710 and 720. Each carrier is operating a two (2) sub-band CA combination. Thus, each carrier is using a CC1 and a CC2 such as shown in FIGS. 3A-3B.

In a first example, carrier 730 is serving CC1 733 and CC2 737 in frequency band 710. This is an example of intra-band contiguous CA, e.g., the CCs 733 and 737 are served in the same frequency band 710 and the sub-bands are adjacent to each other. In a second example, carrier 740 is serving CC1 743 and CC2 747 in frequency band 710. This is an example of intra-band non-contiguous CA, e.g., the CCs 743 and 747 are served in the same frequency band 610 but the sub-bands are not adjacent to each other. In a third example, carrier 750 is serving in CC1 753 in frequency band 710 and CC2 777 in frequency band 720. This is an example of inter-band CA, e.g., the CCs 753 and 757 are served in different frequency bands 710 and 720.

Consider the aligned inter-band CA scenario. In this scenario, the Maximum Receive Time Difference (MRTD) within FR1 of 50 NR is up to 33 microseconds, and across frequency ranges, the MRTD is up to 25 microseconds. This MRTD may result in the PDCCH symbols that are supposed to be aligned actually arriving in a pattern that resembles the unaligned case.

Figure 8A:
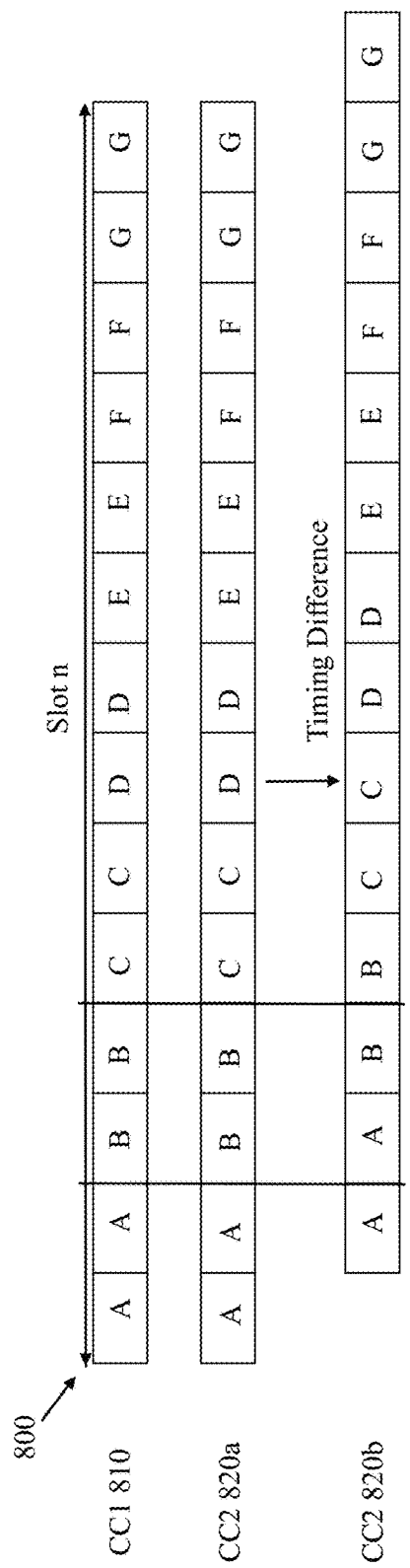
FIGS. 8A and 8B show CA PDCCH timing diagrams illustrating an example of MRTD differences between the CCs.
Figure 8B:
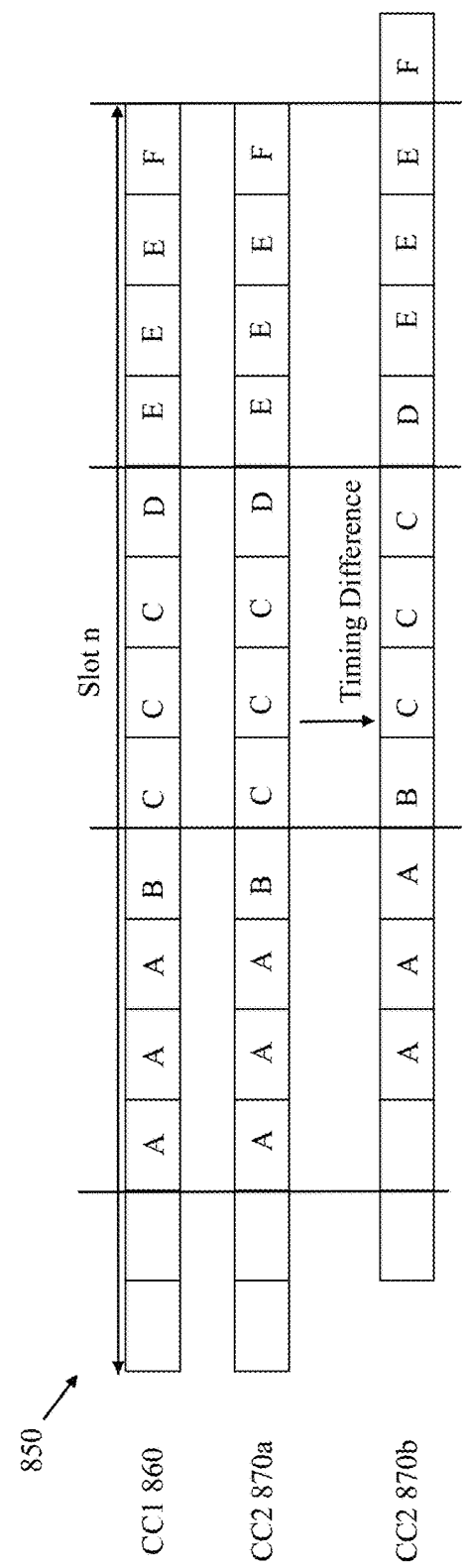

FIGS. 8A and 8B show CA PDCCH timing diagrams 800 and 850 illustrating an example of MRTD differences between the CCs. In FIGS. 8A and 8B, it may be considered that the subcarrier spacing is 30 KHz for inter-band CA. If the MRTD is 33 microseconds, which is approximately the duration of one symbol, for the nominally aligned cases shown for CC1 and CC2 in both FIGS. 8A and 8B, the UE 110 actually receives the PDCCH timing as unaligned.

FIG. 8A shows the nominally aligned PDCCH timing of CC1 810 and CC2 820*a* having a span pattern of {2, 2}. However, the CC2 820*b* shows the PDCCH timing as the PDCCH is actually received by the UE 110. Rather than being aligned, the PDCCH of CC1 810 and CC2 820*b* resembles the unaligned case.

FIG. 8B shows the nominally aligned PDCCH timing of CC1 860 and CC2 870*a* having a span pattern of {4, 3}. However, the CC2 870*b* shows the PDCCH timing as the PDCCH is actually received by the UE 110. Rather than being aligned, the PDCCH of CC1 860 and CC2 870*b* resembles the unaligned case.

Figure 9:
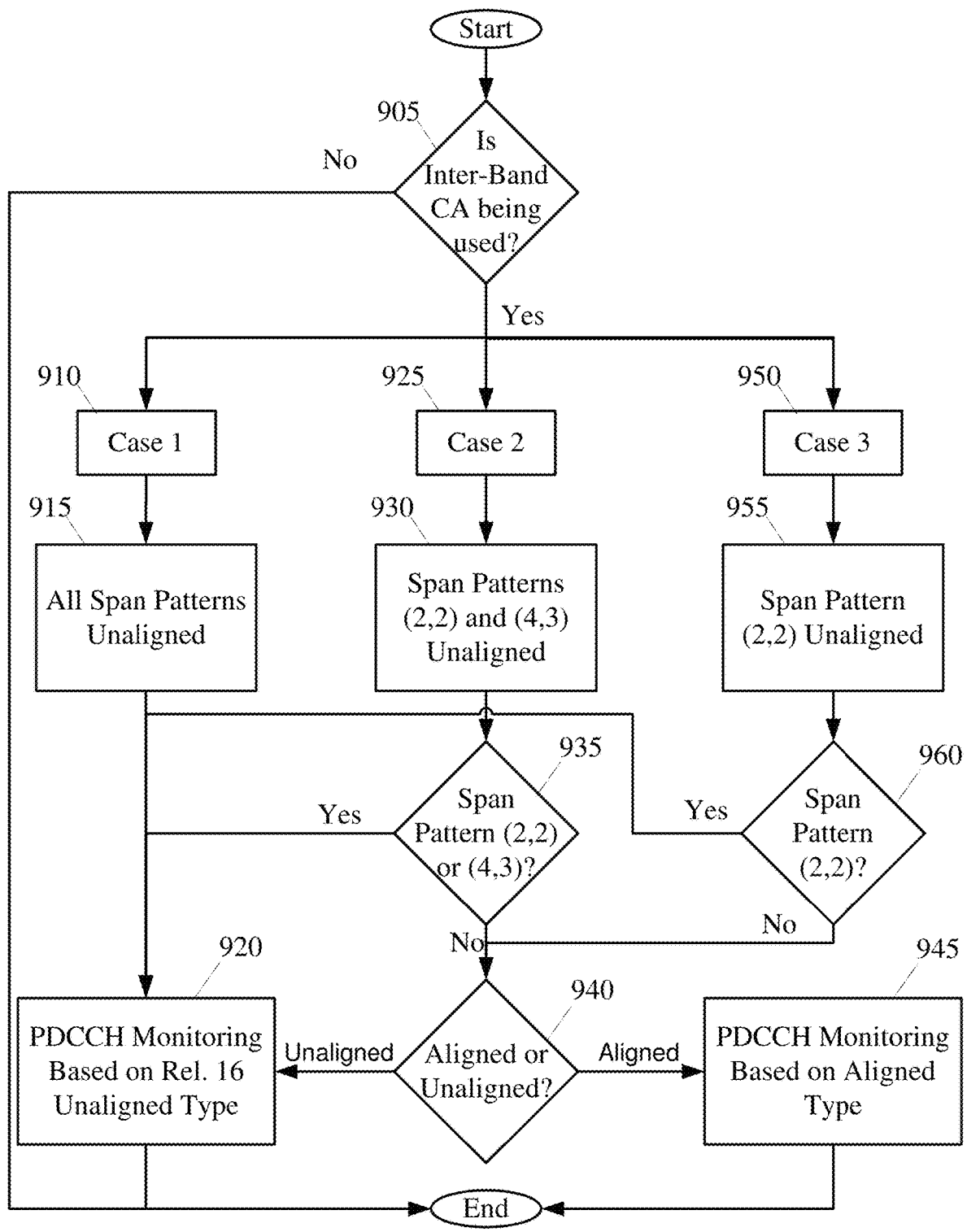
FIG. 9 shows an exemplary method for the UE to select a PDCCH monitoring type for URLLC according to various exemplary embodiments.

FIG. 9 shows an exemplary method 900 for the UE 110 to select a PDCCH monitoring type for URLLC according to various exemplary embodiments. In the exemplary method 900, the UE 110 may select the PDCCH monitoring type based on a span pattern of the PDCCH and/or whether the PDCCH is aligned or unaligned. The exemplary method 900 may be used to resolve the issue of the nominally aligned CCs that are received by the UE 110 as unaligned as described with reference to FIGS. 8A and 8B.

In 905, the UE 110 determines whether inter-band CA is currently being used. If it is not, the method ends as the method 900 applies to scenarios where inter-band CA is being used. If inter-band CA is being used, the UE 110 determines the case for applying the PDCCH monitoring type with which the UE 110 is configured. The configuration of the UE 110 with one of the cases 1-3 may be configured by the network (e.g., via radio resource control (RRC) signaling), may be configured by standard (e.g., the 3GPP standards), or may be up to the UE 110 implementation.

In a first example, it may be considered that the UE 110 is configured with case 1 910. As shown in 915, all CCs with any span pattern across CCs (e.g., {7, 3}, {4, 3}, {2, 2}) are considered to be unaligned. That is, even the nominally aligned CCs are considered to be unaligned for inter-band CA. As described above, the reason for this assumption that while the CCs may be nominally aligned, because there may be MRTD between the received CCs, the UE 110 may see the PDCCH as unaligned.

Thus, in 920, the UE 110 will perform PDCCH monitoring based on the Rel. 16 unaligned monitoring type as described above. For example, all CCs will be considered unaligned and the worst span in each CC is used in counting the number of blind decodes and the number of non-overlapping CCEs.

In a second example, it may be considered that the UE 110 is configured with case 2 925. As shown in 930, the CCs having a span pattern of {4, 3} and {2, 2} are considered to be unaligned. While the CCs that have a span pattern of {7, 3} may be tested to determine if the CCs are aligned or not aligned and processed accordingly.

Thus, if it is determined in 935 that the CCs have a span pattern of {4, 3} or {2, 2}, the UE 110, in 920, will perform PDCCH monitoring based on the Rel. 16 unaligned monitoring type as was described above. If, in 935, the span pattern is not {4, 3} or {2, 2} (e.g., the span pattern is {7, 3}), the method 900 proceeds to 940 where the UE 110 determines if the CCs are aligned or not aligned. If the CCs are unaligned, the UE 110, in 920, will perform PDCCH monitoring based on the Rel. 16 unaligned monitoring type as was described above. If the CCs are aligned, the UE 110, in 945, will perform PDCCH monitoring based on Rel. 16 aligned monitoring type as was described above.

In a third example, it may be considered that the UE 110 is configured with case 3 950. As shown in 955, the CCs having a span pattern of {2, 2} are considered to be unaligned. Thus, if it is determined in 960 that the CCs have a span pattern of {2, 2}, the UE 110, in 920, will perform PDCCH monitoring based on the Rel. 16 unaligned monitoring type as was described above. If, in 960, the span pattern is not {2, 2} (e.g., the span pattern is {4, 3} or {7, 3}), the method proceeds 940 where the UE 110 determines if the CCs are aligned or not aligned. If the CCs are unaligned, the UE 110, in 920, will perform PDCCH monitoring based on the Rel. 16 unaligned monitoring type as was described above. If the CCs are aligned, the UE 110, in 945, will perform PDCCH monitoring based on the Rel. 16 aligned monitoring type as was described above.

Figure 10:
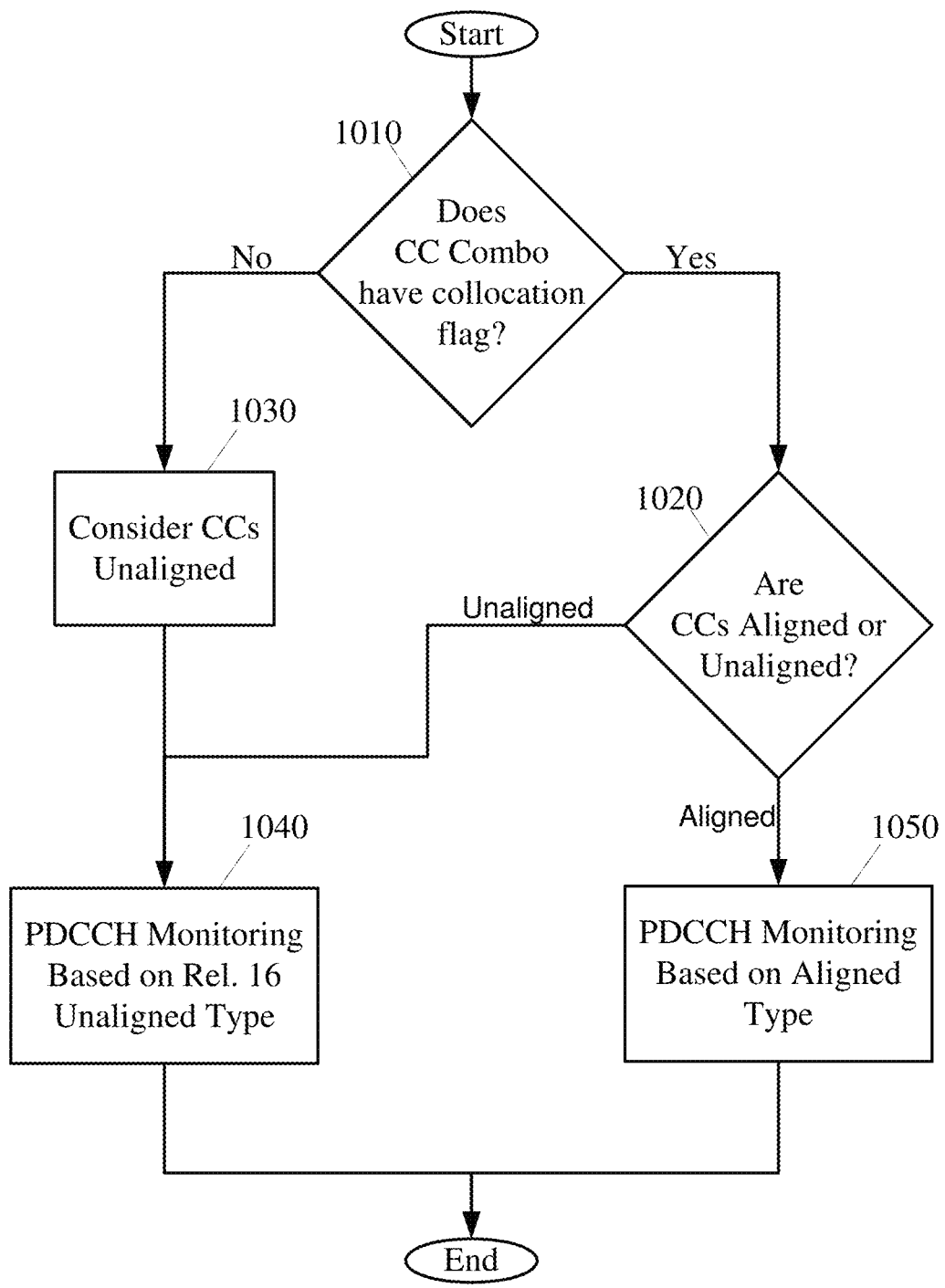
FIG. 10 shows a second exemplary method for the UE to select a PDCCH monitoring type for URLLC according to various exemplary embodiments.

FIG. 10 shows a second exemplary method 1000 for the UE 110 to select a PDCCH monitoring type for URLLC according to various exemplary embodiments. The method 1000 is based on the gNB (e.g., gNB 120A or gNB 120B) providing a collocation flag for CC combinations. Those skilled in the art will understand that collocation of the CCs indicates that the cells that are serving the CCs are physically located in the same location. (e.g., on the same cell tower). The collocation information may be used to understand whether there will be a difference in receive time for the CCs. Since the two cells serving the CCs are in the same relative location, it is unlikely that there will be a receive time difference at the UE 110 because the signals will be propagated at the same time from the same location through the same physical circumstances (e.g., atmospheric conditions, obstacles, etc.). Thus, when the CCs are collocated, the MRTD difference described above is unlikely to occur and aligned PDCCH symbols should arrive at the UE 110 in relative alignment. This knowledge may be used by the UE 110 to select the type of PDCCH monitoring as will be described in greater detail below.

In 1010, the UE 110 determines whether the CC combination has a collocation flag set. As described above, the gNB 120A or 120B when configuring the CA combination for the UE 110 may include a flag in the configuration information that informs the UE 110 whether the CCs are collocated. If the CCs are not collocated, the method continues to 1030 where the UE 110 considers that the CCs are unaligned, regardless of whether the CCs were nominally aligned. As described above, when CCs are collocated, the UE 110 may assume that aligned PDCCH symbols will arrive relatively aligned. However, when the CCs are not collocated, the PDCCH symbols in the CCs may experience the MAID difference as described above and even the nominally aligned PDCCH symbols may arrive unaligned. Thus, in this case, the UE 110, in 940, will perform PDCCH monitoring based on the Rel. 16 unaligned monitoring type as was described above.

However, if it is determined in 1010 that the CCs are collocated, the UE 110, in 1020, may determine whether the PDCCH are aligned or unaligned. For unaligned PDCCH cases, the UE 110, in 1040, will perform PDCCH monitoring based on the Rel. 16 unaligned monitoring type as was described above. For aligned PDCCH cases, the UE 110, in 1050, will perform PDCCH monitoring based on either the Rel. 15 aligned monitoring limits or the Rel. 16 aligned monitoring limits as were described above.

In other exemplary embodiments, the CCs may be divided into collocation groups across cell groups or within cell groups. As those skilled in the art will understand, cells may be split into a master cell group (MCG) and a secondary cell group (SCG) with respect to the UE 110. Thus, the UE 110 may understand whether the CCs are collocated based on the cell groups to which the CCs belong. The specific manner of dividing the CCs into cell groups is beyond the scope of this disclosure as those skilled in the art will understand that there may be many manners of dividing the CCs into cell groups. The purpose of the groups is to signal collocation information to the UE 110.

In some exemplary embodiments, when CCs are divided into collocation groups within a cell group, the UE 110 may report capability information to the gNB 120A or 120B. For example, the capability information may include whether the UE 110 supports the Rel. 15 aligned monitoring limits for the MCG and/or SCG and whether the UE 110 supports the Rel. 16 aligned and/or unaligned monitoring limits for the MCG and/or SCG.

The gNB 120A or 120B may then configure the UE 110 as to the type of PDCCH monitoring for each collocation group within a cell group based on the capability information received from the UE 110. The configuration may be sent to the UE 110 via RRC signaling.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE):
determining if the UE is operating in carrier aggregation (CA) mode with a first component carrier (CC) in a first frequency band and a second CC in a second frequency band;
when the UE is operating in CA with a first CC in the first frequency band and the second CC in the second frequency band, determining a span pattern for Physical Downlink Control Channel (PDCCH) symbols being received on the first and second CC; and
selecting a PDCCH monitoring type based on, at least, the span pattern.

2. The method of claim 1, wherein the span pattern comprises one of a {2,2} pattern, a {4,3} pattern, or a {7,3} pattern.

3. The method of claim 2, wherein a Rel 16 unaligned PDCCH monitoring type is selected for all span patterns.

4. The method of claim 2, wherein a Rel 16 unaligned PDCCH monitoring type is selected for the {2,2} pattern or the {4,3} pattern.

5. The method of claim 2, wherein a Rel 16 unaligned PDCCH monitoring type is selected for the {2,2} pattern.

6. The method of claim 1, further comprising:
determining whether the PDCCH symbols received on the first CC and the second CC are aligned or unaligned, wherein selecting the PDCCH monitoring type is further based on whether the PDCCH symbols received on the first CC and the second CC are aligned or unaligned.

7. The method of claim 1, wherein the PDCCH monitoring type comprises a Rel 16 unaligned PDCCH monitoring type comprising a number of blind decodes attempted on the first CC and the second CC is max(symbol(a),symbol(b))+max(symbol(c),symbol(d)) that is less than or equal to a determined maximum number of blind decodes, wherein symbol(a) and symbol(b) are decodes on spans on the first CC and symbol(c) and symbol(d) are decodes on spans on the second CC.

8. The method of claim 1, wherein the PDCCH monitoring type comprises a Rel 16 unaligned PDCCH monitoring type comprising a number of nonoverlapping CCEs attempted on the first CC and the second CC is max(symbol(a'),symbol(b'))+max(symbol(c'),symbol(d')) that is less than or equal to a determined maximum number of nonoverlapping CCEs, wherein symbol(a') and symbol(b') are nonoverlapping CCEs received on spans on the first CC and symbol(c') and symbol(d') are nonoverlapping CCEs received spans on the second CC.

9. The method of claim 1, wherein the PDCCH monitoring type comprises a Rel 16 aligned PDCCH monitoring type comprising a first number of blind decodes attempted for a first span received on the first CC and a first span received on the second CC is less than or equal to a determined maximum number of blind decodes and a second number of blind decodes attempted for a second PDCCH span received on the first CC and a second PDCCH span received on the second CC is less than or equal to the determined maximum number of blind decodes.

10. The method of claim 1, wherein the PDCCH monitoring type comprises a Rel 15 aligned PDCCH monitoring type comprising a number of blind decodes attempted for a PDCCH symbol pair received on the first CC and the second CC is less than or equal to a predetermined maximum number of blind decodes.

11. A user equipment (UE), comprising:
one or more processors configured to:
determine if the UE is operating in carrier aggregation (CA) mode with a first component carrier (CC) in a first frequency band and a second CC in a second frequency band;
when the UE is operating in CA with a first CC in the first frequency band and the second CC in the second frequency band, determine a span pattern for Physical Downlink Control Channel (PDCCH) symbols being received on the first and second CC; and
select a PDCCH monitoring type based on, at least, the span pattern; and
a transceiver communicatively connected to the one or more processors.

12. The UE of claim 11, wherein a Rel 16 unaligned PDCCH monitoring type is selected for all span patterns.

13. The UE of claim 11, wherein a Rel 16 unaligned PDCCH monitoring type is selected for the {2,2} pattern or the {4,3} pattern.

14. The UE of claim 11, wherein a Rel 16 unaligned PDCCH monitoring type is selected for the {2,2} pattern.

15. An apparatus of a user equipment (UE), the apparatus comprising processing circuitry configured to:
determine if the UE is operating in carrier aggregation (CA) mode with a first component carrier (CC) in a first frequency band and a second CC in a second frequency band;
when the UE is operating in CA with a first CC in the first frequency band and the second CC in the second frequency band, determine a span pattern for Physical Downlink Control Channel (PDCCH) symbols being received on the first and second CC; and
select a PDCCH monitoring type based on, at least, the span pattern.

16. The apparatus of claim 15, wherein the processing circuitry is further configured to:
determine whether the PDCCH symbols received on the first CC and the second CC are aligned or unaligned, wherein selecting the PDCCH monitoring type is further based on whether the PDCCH symbols received on the first CC and the second CC are aligned or unaligned.

17. The apparatus of claim 15, wherein the PDCCH monitoring type comprises a Rel 16 unaligned PDCCH monitoring type comprising a number of blind decodes attempted on the first CC and the second CC is max(symbol (a),symbol(b))+max(symbol(c),symbol(d)) that is less than or equal to a determined maximum number of blind decodes, wherein symbol(a) and symbol(b) are decodes on spans on the first CC and symbol(c) and symbol(d) are decodes on spans on the second CC.

18. The apparatus of claim 15, wherein the PDCCH monitoring type comprises a Rel 16 unaligned PDCCH monitoring type comprising a number of nonoverlapping CCEs attempted on the first CC and the second CC is max(symbol(a'),symbol(b'))+max(symbol(c'),symbol(d')) that is less than or equal to a determined maximum number of nonoverlapping CCEs, wherein symbol(a') and symbol(b') are nonoverlapping CCEs received on spans on the first CC and symbol(c') and symbol(d') are nonoverlapping CCEs received spans on the second CC.

19. The apparatus of claim 15, wherein the PDCCH monitoring type comprises a Rel 16 aligned PDCCH monitoring type comprising a first number of blind decodes attempted for a first span received on the first CC and a first span received on the second CC is less than or equal to a determined maximum number of blind decodes and a second number of blind decodes attempted for a second PDCCH span received on the first CC and a second PDCCH span received on the second CC is less than or equal to the determined maximum number of blind decodes.

20. The apparatus of claim 15, wherein the PDCCH monitoring type comprises a Rel 15 aligned PDCCH monitoring type comprising a number of blind decodes attempted for a PDCCH symbol pair received on the first CC and the second CC is less than or equal to a predetermined maximum number of blind decodes.

\* \* \* \* \*